United States Patent
Khojastepour et al.

(10) Patent No.: US 8,537,928 B2
(45) Date of Patent: *Sep. 17, 2013

(54) CHANNEL ESTIMATION METHODS AND SYSTEMS BASED ON POWER MEASUREMENT AT RECEIVERS

(75) Inventors: Mohammad A. Khojastepour, North Brunswick, NJ (US); Karthikeyan Sundaresan, Howell, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/901,076

(22) Filed: Oct. 8, 2010

(65) Prior Publication Data
US 2012/0087419 A1    Apr. 12, 2012

(51) Int. Cl.
*H04L 27/10*    (2006.01)
(52) U.S. Cl.
USPC ........... 375/284; 375/144; 375/285; 375/340; 375/349
(58) Field of Classification Search
USPC ......... 375/130, 140–144, 146–150, 259–260, 375/285, 295–296, 316, 340–343, 346–351
See application file for complete search history.

(56) References Cited

U.S. PATENT DOCUMENTS

| | | | |
|---|---|---|---|
| 7,453,946 B2 | 11/2008 | Sondur | |
| 7,609,774 B2 | 10/2009 | Horng et al. | |
| 2006/0146867 A1* | 7/2006 | Lee et al. | 370/465 |
| 2007/0070944 A1* | 3/2007 | Rinne et al. | 370/329 |
| 2009/0245442 A1* | 10/2009 | Siddharth et al. | 375/347 |
| 2012/0192236 A1* | 7/2012 | Cucala Garcia et al. | 725/62 |
| 2013/0039442 A1* | 2/2013 | Smallcomb et al. | 375/308 |

OTHER PUBLICATIONS

Lakshmanan, S., et al. "Practical Beamforming Based on RSSI Measurements Using Off-The-Shelf Wireless Clients" Proceedings of the 9th ACM SIGCOMM on Internet Measurement Conference, 2009. IMC 2009, Nov. 2009. (7 Pages).

Chen, J., et al. "Joint Synchronization, Channel Length Estimation, and Channel Estimation for the Maximum Likelihood Sequence Estimator for High Speed Wireless Communications" The IEEE Semiannual Vehicular Technology Conference (IEEE VTC). May 2002. pp. 1535-1539.

Fan, J., et al. "Pilot-Aided Channel Estimation Schemes for OFDM Systems With Cyclic Delay Diversity" 2009 IEEE 69th Vehicular Technology Conference (IEEE VTC-Spring). Apr. 2009. pp. 1-5.

(Continued)

*Primary Examiner* — Sam K Ahn
*Assistant Examiner* — James M Perez
(74) *Attorney, Agent, or Firm* — Joseph Kolodka (57) ABSTRACT

Methods and systems that enable the determination of accurate channel estimates by measuring only power values of pilot signal transmissions at a receiver are described. Various measurement procedures that are based on average power measurements or short term, per-symbol measurements can be employed. Furthermore, procedures utilizing adaptive pilots generated with receiver feedback and deterministic pilots generated without receiver feedback are also described.

5 Claims, 2 Drawing Sheets

(56) References Cited

OTHER PUBLICATIONS

Gao, X., et al. "Efficient Channel Estimation for MIMO Single-Carrier Block Transmission With Dual Cyclic Timeslot Structure" IEEE Transactions on Communications. vol. 55, No. 11. Nov. 2007. pp. 2210-2223.

Lakshmanan, S., et al. "Towards Adaptive Beamforming in Indoor Wireless Networks: An Experimental Approach" Proceedings of IEEE International Conference on Computer Communications (INFOCOM). Apr. 2009.

Lakshmanan, S., et al. "Beamforming Methods and Systems Employing Measured Power at a Receiver to Perform Channel Estimation" U.S. Appl. No. 12/724,513, filed Mar. 16, 2010.

* cited by examiner

CHANNEL ESTIMATION METHODS AND SYSTEMS BASED ON POWER MEASUREMENT AT RECEIVERS

BACKGROUND

1. Technical Field

The present invention relates to signal communication and, more particularly, to channel estimation.

2. Description of the Related Art

The problem of channel estimation has been long studied. Most practical systems use coherent detection for which an estimate of the channel has to be provided prior to demodulation or decoding. In certain classes of communication systems, for example, WiFi, it may not be possible to perform conventionally developed channel estimation due to various reasons such as restricted access to the physical layer structure. Hence, access to complete channel coefficients may not be available. However, even in such systems, access to instantaneous received power per symbols or average received power is almost always available.

SUMMARY

Exemplary embodiments described herein implement channel estimation procedures that have a lower latency and utilize a much lower number of pilots than channel estimation procedures employed in known methods. Furthermore, exemplary embodiments can permit the determination of accurate channel estimates by measuring only power values of pilot signal transmissions at a receiver. This aspect enables devices, such as WiFi devices, to exploit the benefits of channel estimation that would otherwise be unavailable to such devices with conventional channel estimation procedures.

One embodiment is directed to a method for processing data signals. In accordance with the method, a first set of pilot signals can be received from a set of antenna elements excited independently on a channel. In addition, a second set of pilot signals can be received from at least one pair of the antenna elements on the channel. Here, one of the antenna elements is a reference antenna element that is included in each pair and is excited simultaneously with the other antenna element in each pair such that the reference antenna element and the other antenna element in the pair are excited at selected power values that are independent of powers of the first set of pilot signals. Moreover, the method may further include determining a channel estimate that is based on a channel gain and a relative phase between the reference antenna element and the other antenna element in each pair. The channel gain and the relative phase can be determined from power measurements on the sets of pilot signals. Thereafter, data signals adapted in accordance with the channel estimate can be processed.

An alternative embodiment is drawn towards a method for processing data signals. The method can begin by receiving pilot signals on a channel and performing measurements on each of the pilot signals at a receiver. Further, a channel estimate that is based on the measurements can be determined, wherein the measurements of the pilot signals used to determine the channel estimate comprise only power measurements. Thereafter, data signals adapted in accordance with the channel estimate can be processed.

Another embodiment is directed to system for transmitting data signals. The system may include a transmitter that is configured to excite each antenna element from a set of antenna elements independently on a channel to generate a first set of pilot signals. The transmitter can be further configured to excite at least one pair of the antenna elements on the channel to generate a second set of pilot signals, where one of the antenna elements is a reference antenna element that is included in each pair and is excited simultaneously with the other antenna element in each pair such that the reference antenna element and the other antenna element in the pair are excited at selected power values that are independent of powers of the first set of pilot signals. The system can also include a receiver that is configured to perform measurements on signals received from the excitations. Here, the receiver or the transmitter can be further configured to determine a channel estimate that is based on a channel gain and a relative phase between the reference antenna element and the other antenna element in each pair that are determined from the measurements. In addition, the receiver can be further configured to process data signals adapted in accordance with the channel estimate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Prior to discussing embodiments in detail, it should be noted that an exemplary case is considered in which only the power of signals received from a transmitter can be measured at a receiver. Further, a multiple antenna system with N transmit and L receive antennas for which the complex baseband model of the channel has 2LN unknown real parameters is considered. It can be shown that the MIMO channel can be estimated up to only $L(2N-1)$ parameters by using power measurement methods. Thus, it is generally not possible to estimate more than this number of parameters by using only power measurements. However, in most practical uses of channel estimates, the overall phase of the channel between the source and the destination is irrelevant for purposes of channel estimation. The overall phase should be understood to mean the channel phase between the first antenna elements at the transmitter and the first antenna elements at the receiver. In addition, the numbering of the antenna elements is also irrelevant for such purposes as long as the numbering is consistent. However, the phases of the other antenna elements with respect to this phase (the differential phase) should be considered when performing channel estimation. Such differential phases in addition to the full channel gains are usually sufficient to perform detection at the receivers and also to perform beamforming or precoding at the transmitters. A procedure that can be employed to estimate the full channel gains and all differential phases with respect to a reference antenna element that is chosen to be the first antenna element is described in more detail herein below. Although the problem is formalized herein below as finding the complex baseband coefficients of a MIMO channel assuming narrow band channel estimation, similar approaches can be used for MIMO-OFDM systems.

To permit ease of understanding of methods and systems described herein, a problem formulation is provided for an exemplary case. The baseband model for a MIMO channel between a single source and multiple receivers is given as $$y_k = H_k x + z_k \qquad (1)$$

where k∈1, 2, . . . , K indicates the index of the users or receivers, $y_k$ is the received signal vector of the user or receiver k, $H_k$ is the channel between the source and receiver k and $z_k$ is the noise at the receiver of user k. The goal in this example is to estimate the channel of each user $H_k$ by sending a sequence of signals, namely pilots, from the transmitter and measuring the received power at the receiver. For simplicity, it can be assumed that, at each transmission time, the total transmit power is denoted by P.

Figure 1:
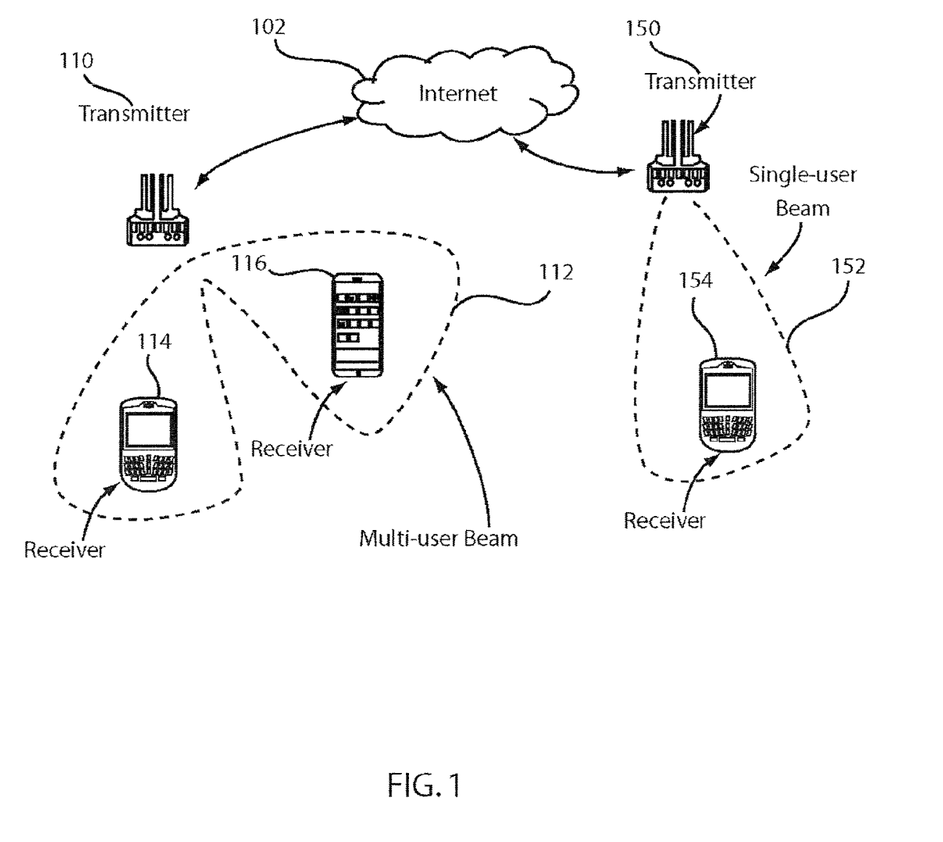
FIG. 1 is a block/flow diagram of a system for transmitting data signals in accordance with exemplary embodiments.

Referring now in detail to the figures in which like numerals represent the same or similar elements and initially to FIG. 1, an exemplary beamforming system 100 that determines precoders/weight distribution of signals transmitted from a plurality of antennae based on channel estimates derived from measured power at a receiver in accordance with an exemplary embodiment of the present invention is illustrated. As shown in FIG. 1, the system 100 may include a wired network, such as the interne 102, and transmitters or access points (AP) 110 and 150, each of which includes a plurality of transmitting antennae to generate beams for transmission of information to receivers. Each transmitter may be configured to employ a single-user beam 152 to communicate with a wireless receiver 154 and/or a multi-user beam 112 to communicate with a plurality of wireless receivers, such as receivers 114 and 116. As indicated above, the system may be modeled as a MIMO system. However, it should be understood that the system 100 is only exemplary and those of skill in the art can devise alternative systems to implement methods described in further detail herein below.

It should be noted that embodiments described herein may be entirely hardware or may include both hardware and software elements. In a preferred embodiment, the present invention is implemented in hardware and software, which includes but is not limited to firmware, resident software, microcode, etc.

Moreover, embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 2:
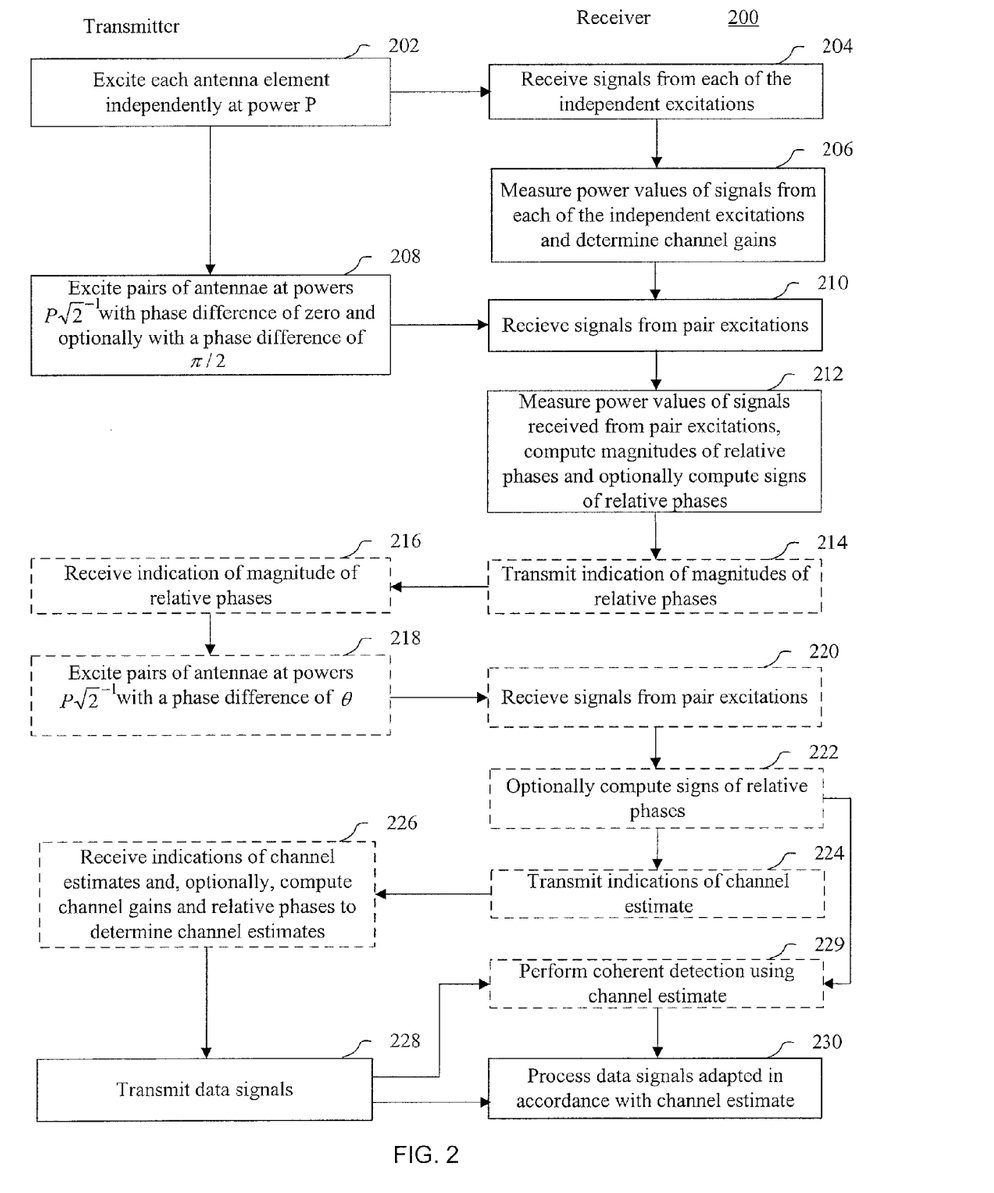
FIG. 2 is a block/flow diagram of a method for transmitting data signals in accordance with exemplary embodiments.

With reference now to FIG. 2 with continuing reference to FIG. 1, a method 200 for processing data signals in accordance with an exemplary embodiment that can be implemented within system 100 is illustrated. It should be understood that any reference to a "transmitter" can refer to any one of the transmitters provided in FIG. 1. Similarly, any reference to a "receiver" can refer to any one of the receivers provided in FIG. 1. Further, method steps that can be performed by a transmitter are provided in the left column of FIG. 2, while method steps that can be performed by a receiver are provided in the right column of FIG. 2.

The method 200 can begin at step 202, in which the transmitter may excite each antenna element independently and successively at power P. In addition, the transmitter may, at step 208, excite pairs of antennae at power $$\frac{P}{\sqrt{2}}$$

for each antenna in a pair with a first phase difference in a first transmission and a second phase difference in a second transmission. Here, a reference antenna element is selected and included in each pair for simultaneous excitation with another antenna element. The first phase difference can be set to zero for convenience purposes and the second phase difference can be set in various ways, depending on whether adaptive or deterministic pilots are employed, both of which are discussed in more detail below.

To illustrate an exemplary implementation of steps 202 and 208, a simple case is considered, in which it can be assumed that only one receive antenna and only two transmit antennas are employed. Here, the channel is denoted by $H_k=[h_1 h_2]$, where $h_1=|h_1|e^{j\Phi_1}$, $h_2=|h_2|e^{j\Phi_2}$ and $\phi_1$ and $\phi_2$ denote the difference between the phase of the received signal and the signals transmitted from antenna 1 and antenna 2 of the transmitter, respectively. In addition, four types of pilot signals may be transmitted for x at steps 202 and 208; namely $[P, 0, 0, \ldots, 0]^T$, $[0, P, 0, \ldots, 0]^T$, $$\left[\frac{P}{\sqrt{2}}, \frac{P}{\sqrt{2}}, 0, \ldots, 0\right]^T, \text{ and } \left[\frac{P}{\sqrt{2}}, \frac{P}{\sqrt{2}}e^{j\theta}, 0, \ldots, 0\right]^T.$$

The transpose operation is denoted by $^T$ and Hermitian operation is denoted by *. The received signals can be written as follows $$y_1 = Ph_1 + z_1 \qquad (2)$$

$$y_2 = Ph_2 + z_2 \qquad (3)$$

$$y_3 = \frac{P}{\sqrt{2}}h_1 + \frac{P}{\sqrt{2}}h_2 + z_3 \qquad (4)$$

$$y_4 = \frac{P}{\sqrt{2}} h_1 + \frac{P}{\sqrt{2}} e^{j\phi} h_2 + z_4 \quad (5)$$

It should be noted that the simple case can be extended to any number of transmit antennas. For example, if N transmit antenna are used, then N pilots are transmitted by exciting each transmit antenna element with power P, as discussed above with respect to step 202. Further, at step 208, one antenna element is selected as a reference (e.g., the first antenna element) and the reference antenna element can be excited simultaneously with every other antenna elements with equal power $$\frac{P}{\sqrt{2}}$$

in pairs, as stated above. Here, the excitations of pairs of antenna can be performed in tandem and two different excitations can be performed per pair. Because the excitation for any pair is performed twice with the phases 0 and θ, the total number of such excitations would be 2(N−1). Thus, if no repetition is used, the total number of pilot transmissions would be 3N−2. It should be noted that, here, only the number of pilot patterns needed are considered and in the case of multiple pilot transmissions for each pilot pattern, the total number of pilots would be more than 3N−2. For example, if each pilot pattern is transmitted M times the total number of pilots would be (3N−2)M.

It should be understood that, although the pairwise excitations is described herein as being performed at power $$\frac{P}{\sqrt{2}}$$

for convenience purposes, the power applied by the transmitter in the pairwise excitations can be virtually any power value. In particular, the powers applied in the pairwise excitations are not in any way dependent upon the powers applied to the antennas by the transmitter in the isolated or independent excitations of step 202 or upon the powers of the signals received from the isolated or independent excitations at step 204. The lack of dependency on the received power of signals is especially beneficial, as it does not require feedback from the receiver indicating the received power values for use in applying the pairwise excitations at the transmitter. This aspect, in turn, reduces the possibility of error due to potential corruption of the feedback transmission and also reduces latency.

At steps 204 and 210, the receiver can receive signals from each of the independent excitations and from the pair excitations, respectively. In turn, at steps 206 and 212, the receiver can measure the power values of signals received from the independent and pair excitations, respectively. At step 206, the receiver can determine the channel gains from the measured power values of signals received from the independent excitations. Moreover, the receiver can compute the magnitude and optionally the sign of the relative phase between the antenna elements in each pair from measured power values of signals received from the pair excitations.

For example, a scenario in which channel estimation is based on average or long term power measurements is considered. If the power measurement for each type of pilot signals is the averaged value over all received signals of the same pilot type in the simple case provided above, then the measured signals are as follows $$Q(y_1) = P^2 |h_1|^2 + E[z_1 z_1^*] \quad (6)$$

$$Q(y_2) = P^2 |h_2|^2 + E[z_2 z_2^*] \quad (7)$$

$$Q(y_3) = \frac{P^2}{2}(|h_1|^2 + |h_2|^2) + P^2 |h_1 h_2| \cos(\phi_2 - \phi_1) + E[z_3 z_3^*] \quad (8)$$

$$Q(y_4) = \frac{P^2}{2}(|h_1|^2 + |h_2|^2) + P^2 |h_1 h_2| \cos(\phi_2 - \phi_1 + \theta) + E[z_4 z_4^*] \quad (9)$$

Here $z_i$, i=1, ..., 4 can be assumed to be identically distributed random variables that incorporate the effect of the noise and interference at the receiver. It is usually possible to estimate the noise-plus-interference variance $\sigma^2$ separately from the pilot signals and track its potential change over time. So, under the above measurement scenario, it is simple to calculate the channel gains $|h_1|$ and $|h_2|$ at step 206, from (6) and (7).

$$|h_1| = \sqrt{\frac{Q(y_1) - \sigma^2}{P^2}} \quad (10)$$

$$|h_2| = \sqrt{\frac{Q(y_2) - \sigma^2}{P^2}} \quad (11)$$

By plugging the result into (8) it is then possible, at step 212, to find the differential phase $\phi_{21} = \phi_2 - \phi_1$ of $h_2$ with respect to $h_1$ with the exception of the sign, i.e., only $|\phi_{21}|$ is found:

$$|\phi_{21}| = \arccos \frac{2Q(y_3) - P^2|h_1|^2 - P^2|h_2|^2 - 2\sigma^2}{2P^2|h_1 h_2|} \quad (12)$$

To resolve the ambiguity of the phase, a non-adaptive (deterministic) pilot or an adaptive pilot can be used by appropriately selecting a phase difference θ.

For example, for deterministic pilots, in which the pilots are known a priori without any feedback from the receiver, the second phase difference of the optional second transmission described above with respect to step 208 may be set to θ=π/2. In this case from (9), $\sin \phi_{21}$ can be found, which resolves the ambiguity of the sign of the relative phase $\phi_{21}$ between signals transmitted from antenna element 1 and antenna element 2 of the transmitter. Since $0 < |\phi_{21}| < \pi$, the sign of $\phi_{21}$ is the same as the sign of $\sin \phi_{21}$. Accordingly, the sign of the relative phase $\phi_{21}$ can be determined, optionally at step 212, as follows:

$$\text{sign}(\phi_{21}) = \text{sign}\left( \arcsin \frac{2Q(y_4) - P^2|h_1|^2 - P^2|h_2|^2 - 2\sigma^2}{2P^2|h_1 h_2|} \right) \quad (13)$$

To better illustrate the independence of the powers applied in the pairwise excitations with respect to the powers applied or received at steps 202 and 204, respectively, a more general case is considered. For example, the four types of pilot signals that may be transmitted for x at steps 202 and 208 can be re-written as follows $[P_1, 0, 0, \ldots, 0]^T$, $[0, P_2, 0, \ldots, 0]^T$, $[P_3, P_4, 0, \ldots, 0]^T$ and $[P_5, P_6 e^{j\theta}, 0, \ldots, 0]^T$. Thus, in the two-transmit antenna case, each antenna element may be excited at powers $P_1$ and $P_2$, respectively, at step 202 and the pairwise excitations in step 208 may be performed at powers $P_3$ and $P_4$ with a phase difference of zero and at $P_5$ and $P_6$ with a phase difference of $\theta$ for the first and second transmit antennas, respectively. Here, the transmission gain values $P_i$ are chosen such that the power constraint $P^2$ in each transmission is satisfied. More precisely, $P_1 < P$, $P_2 \leq P$, $P_3^2 + P_4^2 \leq P^2$, and $P_5^2 + P_6^2 \leq P^2$. As noted above, the transpose operation is denoted by $^T$ and Hermitian operation is denoted by *. The received signals can be written as follows $$y_1 = P_1 h_1 + z_1 \qquad (2a)$$

$$y_2 = P_2 h_2 + z_2 \qquad (3a)$$

$$y_3 = P_3 h_1 + P_4 h_2 + z_3 \qquad (4a)$$

$$y_4 = P_5 h_1 + P_6 e^{j\phi} h_2 + z_4 \qquad (5a)$$

For example, a scenario in which channel estimation is based on average or long term power measurements is considered. If the power measurement for each type of pilot signals is the averaged value over all received signals of the same pilot type in the more general case provided above, then the measured signals are as follows $$Q(y_1) = P_1^2 |h_1|^2 + E[z_1 z^*_1] \qquad (6a)$$

$$Q(y_2) = P_2^2 |h_2|^2 + E[z_2 z^*_2] \qquad (7a)$$

$$Q(y_3) = P_3^2 |h_1|^2 + P_4^2 |h_2|^2 + 2 P_3 P_4 |h_1 h_2| \cos(\phi_2 - \phi_1) + E[z_3 z^*_3] \qquad (8a)$$

$$Q(y_4) = P_5^2 |h_1|^2 + P_6^2 |h_2|^2 + 2 P_5 P_6 |h_1 h_2| \cos(\phi_2 - \phi_1 + \theta) + E[z_4 z^*_4] \qquad (9a)$$

Here, similar to the simple case provided above, $z_i$, $i = 1, \ldots, 4$, can be assumed to be identically distributed random variables that incorporate the effect of the noise and interference at the receiver. In addition, the noise-plus-interference variance $\sigma^2$ can be estimated separately from the pilot signals and its potential change over time can be tracked. Thus, under the above-described measurement scenario, the channel gains $|h_1|$ and $|h_2|$ can be calculated at step 206 from (6a) and (7a) as follows:

$$|h_1| = \sqrt{\frac{Q(y_1) - \sigma^2}{P_1^2}} \qquad (10a)$$

$$|h_2| = \sqrt{\frac{Q(y_2) - \sigma^2}{P_2^2}} \qquad (11a)$$

By plugging the result into (8a), it is then possible, at step 212, to find the differential phase $\phi_{21} = \phi_2 - \phi_1$ of $h_2$ with respect to $h_1$ with the exception of the sign. In other words, $|\phi_{21}|$ can be found at step 212:

$$|\phi_{21}| = \arccos \frac{2Q(y_3) - P_3^2 |h_1|^2 - P_4^2 |h_2|^2 - 2\sigma^2}{2 P_3 P_4 |h_1 h_2|} \qquad (12a)$$

As discussed above, to resolve the ambiguity of the phase, a non-adaptive (deterministic) pilot or an adaptive pilot can be used by appropriately selecting a phase difference $\theta$.

For example, for deterministic pilots, in which the pilots are known a priori without any feedback from the receiver, the second phase difference of the optional second transmission described above with respect to step 208 may be set to $\theta = \pi/2$. In this case from (9a), $\sin \phi_{21}$ can be found, which resolves the ambiguity of the sign of the relative phase $\phi_{21}$ between signals transmitted from antenna element 1 and antenna element 2 of the transmitter. Since $0 < |\phi_{21}| < \pi$, the sign of $\phi_{21}$ is the same as the sign of $\sin \phi_{21}$. Accordingly, the sign of the relative phase $\phi_{21}$ can be determined, optionally at step 212, as follows:

$$\mathrm{sign}(\phi_{21}) = \mathrm{sign}\left( \arcsin \frac{2Q(y_4) - P_5^2 |h_1|^2 - P_6^2 |h_2|^2 - 2\sigma^2}{2 P_5 P_6 |h_1 h_2|} \right) \qquad (13a)$$

Turning now to adaptive pilots, feedback from the receiver can be employed to set the second phase difference of the second transmission. For example, at optional step 214, the receiver can transmit an indication of the magnitudes of relative phases to the transmitter. It should be noted that the indication of magnitudes of relative phases can be the magnitudes of the relative phases, such as the magnitude of the relative phase $\phi_{21}$ determined in accordance with equation 12 or equation 12a. Alternatively, the indication of magnitudes of relative phases can be the power values measured at steps 206 and 212. Here, at optional step 216, the transmitter can receive the indication and can optionally employ the power values to determine the channel gains, for example, as discussed above with respect to equations 10 and 11 or 10a and 11a, and to determine the magnitudes of relative phases, for example, as discussed above with regard to equation 13 or 13a.

In the adaptive pilot case, as opposed to performing the second transmission with a given phase difference of $\theta$ at step 208, the second transmission is performed at optional step 218, in which the transmitter can excite pairs of antenna (in tandem if more than two antenna are used at the transmitter), with the reference antenna element in each pair, at a power of $$\frac{\sqrt{P}}{2}$$

(in the simple case described above) and a given phase difference of $\theta$. In the simple case and the more general case described above, the pilot is transmitted by choosing $\theta = |\phi_{21}|$ if $|\phi_{21}| < \pi/2$ and setting $\theta = \pi - |\phi_{21}|$ if $|\phi_{21}| \geq \pi/2$.

At optional step 220, the receiver can receive signals from the pair excitation of optional step 218. Thereafter, at optional step 222, the receiver can compute the signs of the relative phases. For example, in the simple and more general two transmitter antenna cases described above, where $|\phi_{21}| < \pi/2$, if $Q(y_4) > Q(y_3)$, then the receiver can determine that the relative phase is $\phi_{21} = -\theta$; and if $Q(y_4) \leq Q(y_3)$ the receiver can determine that the relative phase is $\phi_{21} = \theta$. Where $|\phi_{21}| \geq \pi/2$, if $Q(y_4) < Q(y_3)$, then the receiver can determine that the relative phase is $\phi_{21} = \theta$; and if $Q(y_4) \geq Q(y_3)$ then the receiver can determine that the relative phase is $\phi_{21} = -\theta$.

At optional step 224, the receiver can transmit an indication of the channel estimate to the transmitter. The indication of the channel estimate can include any one or more of the channel gains computed at step 206, the magnitudes of the relative phases computed at step 212, the signs of the relative phases computed at step 212 or step 222, or the power values measured at step 206 and/or step 212. Alternatively, if precoders are employed at the transmitter to adapt data signals for transmission to the receiver in accordance with the channel estimate, the indication of the channel estimate can simply be a precoder index to improve transmission efficiency. In turn, the transmitter can receive the indication of the channel estimate at optional step 226. If the power values are transmitted as the indication of the channel estimate, then, optionally at step 226, the transmitter, instead of the receiver, can compute any one or more of the channel gains, the magnitudes of the relative phases and/or the signs of the relative phases based on the power values as described herein.

At step 228, the transmitter can transmit data signals to the receiver. For example, the transmitter may compute beamforming weights or precoders for the signals and may weight the signals for the transmission of data to the receiver by applying the weights or precoders using the computed magnitudes and relative phases, as understood by those of skill in the art. Alternatively, as stated above, the transmitter can apply a precoder index to adapt the data signals in accordance with the channel estimate. Further, according to other aspects, the transmitted data signals need not be adapted in accordance with the channel estimate.

For example, the receiver, at optional step 229, can receive the data signals transmitted at step 228 and can employ channel estimates determined at steps 212 and 222 to adapt the received data signals for purposes of performing coherent signal detection on the received data signals.

At step 230, the receiver may process data signals adapted in accordance with the channel estimate. For example, the data signals can be adapted by the transmitter at step 228 in accordance with the channel estimate using, for example, precoders as discussed above. In addition, the data signals can be adapted by the receiver at step 229 in accordance with the channel estimate to perform signal detection, as discussed above. The receiver may process the adapted signals to extract data therefrom.

It should be noted that the validity of measurement models (6)-(9) and (6a)-(9a) depend on the number of samples over which the expectation is taken. In practice, there are number of cases in which one pilot transmission would be repeated in a block and a receiver only has access to the average received power, e.g., the RSSI in 802.11 wireless devices.

On the other hand, there are situations in which more control on the power measurement permitted. Returning to steps 206 and 212, a scenario in which channel estimation is based on multiple power measurements for the simple case is considered. Here, the power measurements are "short term," as a measurement is taken per sample or symbol or is averaged over a small group of samples or symbols.

In such cases, the received signal powers for the $k^{th}$ measurement for each of the previously mentioned pilot structures in the simple case are given by $$Q(y_{1,k}) = P^2|h_1|^2 + 2P(h_{1r}z_{1r,k} + h_{1j}z_{1j,k}) + z_{1,k}z_{1,k}^* \tag{14}$$

$$Q(y_{2,k}) = P^2|h_2|^2 + 2P(h_{2r}z_{2r,k} + h_{2j}z_{2j,k}) + z_{2,k}z_{2,k}^* \tag{15}$$

$$Q(y_{3,k}) = \frac{P^2}{2}(|h_1|^2 + |h_2|^2) + P^2|h_1 h_2|\cos(\phi_2 - \phi_1) + \tag{16}$$
$$\frac{2P}{\sqrt{2}}(\Re(h_1 + h_2)z_{3r,k} + \Im(h_1 + h_2)z_{3j,k}) + z_{3,k}z_{3,k}^*$$

$$Q(y_{4,k}) = \frac{P^2}{2}(|h_1|^2 + |h_2|^2) + P^2|h_1 h_2|\cos(\phi_2 - \phi_1 + \theta) + \tag{17}$$
$$\frac{2P}{\sqrt{2}}(\Re(h_1 + h_2 e^{j\theta})z_{4r,k} + \Im(h_1 + h_2 e^{j\theta})z_{4j,k}) + z_{4,k}z_{4,k}^*$$

where r and j in the subscript denotes the real part and imaginary part. For example, $h_{1r}$ and $z_{1j,k}$ denote the real part of $h_1$ and the imaginary part of $z_{1,k}$, respectively. Also, the second sub-index denotes the observation index corresponding to a given pilot pattern transmission.

The best estimator uses all measurements to jointly find $h_1$, $h_2, \ldots, h_N$ where N transmit antennas are used. However, by relaxing optimality and incurring a slight loss in performance, the gain of the channel $h_i$, $i=1, \ldots, N$ is estimated independently by using only the pilot pattern where only the $i^{th}$ transmit antenna is driven with power P. For example, the transmitter can excite each antenna element independently as described above with respect to step 202 and the channel gain can be estimated from the measured power values by the receiver at step 206 or by the transmitter at step 216 or step 226. Thereafter, to find the differential phase, pair-wise excitations can be employed. For example, the transmitter can perform pair-wise excitations as described above with regard to step 208 and optional step 218 and the relative or differential phase can be found by the receiver at step 212 and optional step 222 or by the transmitter at step 226, as discussed above.

M measurements that can be performed by the receiver at step 206 for the channel $h_1$ with the following form $$Q(y_{1,k}) = P^2|h_1|^2 + 2P(h_{1r}z_{1r,k} + h_{1j}z_{1j,k}) + z_{1,k}z_{1,k}^*,$$
$$k=1, \ldots, M. \tag{18}$$

Under fair assumption for many practical systems, the variance of the random variable $z_{1,k}z_{1,k}^*$ is usually an order of magnitude smaller than that of the random variable $2P(h_{1r}z_{1r,k} + h_{1j}z_{1j,k})$. It is due to the fact that the system is designed such that the received power at the receivers are reasonably larger than the noise variance. Under this assumption the term $z_{1,k}z_{1,k}^*$ for can be ignored for the moment and $Q(y_{1,k})$ can be written as $$Q(y_{1,k}) \approx \tilde{Q}(y_{1,k}) = P^2|h_1|^2 + \tilde{z}_{1,k} \tag{19}$$

where $\tilde{z}_{1,k} = 2P(h_{1r}z_{1r,k} + h_{1j}z_{1j,k})$ \tag{20}

A way of compensating for the effect of the noise term $z_{1,k}z_{1,k}^*$ that was ignored here is described in greater detail herein below. Under the assumption that $z_{1,k}$ is a circularly symmetric complex Gaussian noise with zero mean and variance $\sigma^2$, the noise $\tilde{z}_{1,k}$ has Gaussian distribution with zero mean and variance $4P^2|h_1|^2\sigma^2$.

Similarly, by ignoring the smaller noise terms $z_{1,k}z_{1,k}^*$, $2 \leq i \leq 4$, we have $$Q(y_{2,k}) \approx \tilde{Q}(y_{2,k}) = P^2|h_2|^2 + \tilde{z}_{2,k} \tag{21}$$

where $$\tilde{z}_{2,k} = 2P(h_{2r}z_{2r,k} + h_{2j}z_{2j,k}) \tag{22}$$

$$Q(y_{3,k}) \approx \tilde{Q}(y_{3,k}) = \frac{P^2}{2}(|h_1|^2 + |h_2|^2) + P^2|h_1 h_2|\cos(\phi_2 - \phi_1) + \tilde{z}_{3,k} \tag{23}$$

where $$\tilde{z}_{3,k} = \frac{2P}{\sqrt{2}}(\Re(h_1 + h_2)z_{3r,k} + \Im(h_1 + h_2)z_{3j,k}) \tag{24}$$

$$Q(y_{4,k}) \approx \tilde{Q}(y_{4,k}) = \tag{25}$$
$$\frac{P^2}{2}(|h_1|^2 + |h_2|^2) + P^2|h_1 h_2|\cos(\phi_2 - \phi_1 + \theta) + \tilde{z}_{4,k}$$

where $$\tilde{z}_{4,k} = \frac{2P}{\sqrt{2}}(\Re(h_1 + h_2 e^{j\theta})z_{4r,k} + \Im(h_1 + h_2 e^{j\theta})z_{4j,k}) \tag{26}$$

The receiver at step 206 or the transmitter at step 216 or step 226 can use different estimators to estimate $|h_1|$ by employing equation (19). If the variance of the noise is not known, then the minimum variance unbiased (MVU) estimator exists and it is given by $$|h_1| = \sqrt{\frac{1}{MP^2} \sum_{k=1}^{M} Q(y_{1,k})}. \quad (27)$$

The receiver at step 206 or the transmitter at step 216 or step 226 can similarly find the estimate of $|h_2|$, $$X = \frac{P^2}{2}(|h_1|^2 + |h_2|^2) + P^2|h_1 h_2|\cos(\phi_{21})$$

and $$Y = \frac{P^2}{2}(|h_1|^2 + |h_2|^2) + P^2|h_1 h_2|\cos(\phi_{21} + \theta)$$

as follows $$|h_2| = \sqrt{\frac{1}{MP^2} \sum_{k=1}^{M} Q(y_{2,k})} \quad (28)$$

$$X = \frac{1}{M} \sum_{k=1}^{M} Q(y_{3,k}) \quad (29)$$

$$Y = \frac{1}{M} \sum_{k=1}^{M} Q(y_{4,k}) \quad (30)$$

Then, the receiver at step 212 or the transmitter at step 216 or step 226 can determine the magnitude of the relative phase $\phi_{21}$ as follows $$|\phi_{21}| = \arccos \frac{2X - P^2|h_1|^2 - P^2|h_2|^2}{2P^2|h_1 h_2|} \quad (31)$$

Furthermore, if deterministic pilots are employed, the receiver at step 212 or the transmitter at step 226 can determine the sign of the relative phase $\phi_{21}$ as follows $$\text{sign}(\phi_{21}) = \text{sign}\left(\arcsin \frac{2Y - P^2|h_1|^2 - P^2|h_2|^2}{2P^2|h_1 h_2|}\right) \quad (32)$$

Alternatively, if adaptive pilots are employed, the receiver at step 222 or the transmitter at step 226 can determine the sign of the relative phase $\phi_{21}$ as discussed above with regard to steps 214-222. For example, $Q(y_4)$ can be replaced with $Q(y_{4,k})$ and $Q(y_3)$ can be replaced with $Q(y_{3,k})$ to enable the determination of the given phase difference $\theta$ for the second pairwise transmission and the determination of the sign of the relative phase $\phi_{21}$.

In turn, if the noise variance can be estimated, then the estimator (27) will be biased and inefficient. In fact, the MVU estimator cannot be found for this problem. However, an asymptotically efficient estimator can be found as follows.

$$|h_1| = \frac{1}{P} \sqrt{-2\sigma^2 + \sqrt{\frac{1}{M} \sum_{k=1}^{M} Q(y_{1,k})^2 + 4\sigma^4}} \quad (33)$$

Thus, the receiver at step 206 or the transmitter at step 216 or step 226 can use equation (33) to determine the channel gain.

To find the magnitude of differential phase $\phi_{21}$, the receiver at step 212 or the transmitter at step 216 or step 226 can first find the MVU estimator for the quantity $$X = \frac{P^2}{2}(|h_1|^2 + |h_2|^2) + P^2|h_1 h_2|\cos(\phi_{21})$$

by employing equation (16). Using the aforementioned approximation, the term $z_{3,k} z^*_{3,k}$ in equation (16) can be ignored and the variance of the dominant noise term $$\tilde{z}_{3,k} = \frac{2P}{\sqrt{2}}(\Re(h_1 + h_2)z_{3r,k} + \Im(h_1 + h_2)z_{3i,k}),$$

which is calculated as $4\sigma^2 X$, can be found. Thus, the (Maximum Likelihood) ML estimate of X is given by $$X = -2\sigma^2 + \sqrt{\frac{1}{M} \sum_{k=1}^{M} Q(y_{3,k})^2 + 4\sigma^4} \quad (34)$$

As such, the receiver at step 212 or the transmitter at step 216 or step 226 can find $|\phi_{21}|$ by using the result in equation (31).

In addition, if deterministic pilots are employed, the receiver at step 212 or the transmitter at step 226 can determine the sign of the relative phase $\phi_{21}$ as follows. The receiver or the transmitter can first estimate Y as follows $$Y = -2\sigma^2 + \sqrt{\frac{1}{M} \sum_{k=1}^{M} Q(y_{4,k})^2 + 4\sigma^4} \quad (35)$$

and can then use the result in equation (32) to determine the sign of the relative phase $\phi_{21}$.

Alternatively, if adaptive pilots are employed, the receiver at step 222 or the transmitter at step 226 can determine the sign of the relative phase $\phi_{21}$ as discussed above with regard to the case in which the variance of the noise is not known.

It should be noted that the solution given by equations (33), (31) and (32) are for the model provided in equation (19). However, the original model (18) has an extra noise term. In order to compensate for the effect of this noise, we have the following $$\sum_{k=1}^{M} \tilde{Q}(y_{i,k})^2 = \sum_{k=1}^{M} (Q(y_{i,k}) - z_{i,k} z^*_{i,k})^2 \quad (36)$$

$$= \sum_{k=1}^{M} Q(y_{i,k})^2 - 2z_{i,k} z^*_{i,k} Q(y_{i,k}) + (z_{i,k} z^*_{i,k})^2 \quad (37)$$

$$\approx \sum_{k=1}^{M} Q(y_{i,k})^2 - 2\sigma^2 \sum_{k=1}^{M} Q(y_{i,k}) \quad (38)$$

Thus, the receiver at step 206 or the transmitter at step 216 or step 226 can obtain the gain for the $i^{th}$ channel as $$|h_i| = \frac{1}{P}\sqrt{-2\sigma^2 + \sqrt{\frac{1}{M}\sum_{k=1}^{M}Q(y_{i,k})^2 - \frac{2\sigma^2}{M}\sum_{k=1}^{M}Q(y_{i,k}) + 4\sigma^4}} \quad (39)$$

Next, to determine the magnitude of the phase, the receiver at step 212 or the transmitter at step 216 or step 226 can find the estimate of X and Y as follows $$X = -2\sigma^2 + \sqrt{\frac{1}{M}\sum_{k=1}^{M}Q(y_{3,k})^2 - \frac{2\sigma^2}{M}\sum_{k=1}^{M}Q(y_{3,k}) + 4\sigma^4} \quad (40)$$

$$Y = -2\sigma^2 + \sqrt{\frac{1}{M}\sum_{k=1}^{M}Q(y_{4,k})^2 - \frac{2\sigma^2}{M}\sum_{k=1}^{M}Q(y_{4,k}) + 4\sigma^4} \quad (41)$$

Thereafter, the magnitude of the phase $\phi_{21}$ is obtained by using the result in equation (31). In addition, if deterministic pilots are employed, the receiver at step 212 or the transmitter at step 226 can find the sign of the phase $\phi_{21}$ by using equation 32. Alternatively, if adaptive pilots are employed, the receiver at step 222 or the transmitter at step 226 can determine the sign of the relative phase $\phi_{21}$ as discussed above with regard to steps 214-222. For example, $Q(y_4)$ can be replaced with $Q(y_{4,k})$ and $Q(y_3)$ can be replaced with $Q(y_{3,k})$ to enable the determination of the given phase difference θ for the second pairwise transmission and the determination of the sign of the relative phase $\phi_{21}$.

It should be noted that the two-transmitter antenna cases described above can be extended to any number of transmitter or receiver antenna elements. For example, for N transmitter antennas, the channel is given by $H_k = [h_1 \; h_2 \; \ldots \; h_N]$. In addition, the channel gains $h_n$ and relative phases $\phi_{n1}$, with nεN, can be found for n>2 by replacing $h_2$ with $h_n$ and $\phi_{21}$ with $\phi_{n1}$ in the formulations for any of the different procedures described above. Moreover, it is also possible to extend the estimation methods described above to the case in which there is more than one receiver antenna. In such cases, the estimation methods can be performed for each receive antenna separately.

With regard to the pilot structure, it should also be noted that deterministic pilots are usually much more desirable for several reasons. One reason is that the latency would be lower by avoiding the wait time utilized to receive the mid-measurement feedback from the source. Another reason is that such mid-measurement feedback might have error which can, in turn, increase the estimation error. Thus, by employing deterministic pilots, exemplary embodiments eliminate the need for adaptive pilot transmission in which the outcome of power measurement in the intermediate steps has to be fed back to the source in order to decide the subsequent pilot patterns. Therefore, the effect of feedback error in the intermediate steps on the estimation error is averted. Moreover, the benefits of the deterministic pilot signals are especially apparent in a multi-user scenario. For example, if adaptive pilots are employed in the multi-user scenario, the transmitter must process feedback from each user to enable the determination of the channel estimate. However, processing such feedback from a large number of users in the transmitter can render the adaptive pilot method impractical. Because the deterministic pilot structure does not require the use of feedback, the deterministic pilot structure provides a significant advantage over adaptive feedback structures when a large number of users are serviced due its relative simplicity and ease of implementation.

In fair comparison between adaptive and deterministic pilot structures, if the best estimators are used in both cases, the MSE (mean squared error) performance of the estimator might be lower if an adaptive pilot structure is used. Furthermore, in comparison between the MSE performance of the procedures based on the long term (or average) power measurement and the short term (e.g., per symbol or small group of symbols) power measurement, the short term power measurement described herein would likely provide a better performance.

It should be further noted that although the deterministic pilot structure is preferable over the adaptive pilot structure, the adaptive pilot structure disclosed herein nonetheless provides advantages over known adaptive channel estimation procedures. For example, the adaptive pilot structures described herein have a lower latency and ease of implementation due to a relatively low number of pilot patterns transmitted as compared to known adaptive channel estimation procedures. In addition, such benefits over known procedures are even more apparent with the use of the deterministic pilot structure, as only one set of pilots for all users can be transmitted.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for processing data signals comprising:
 receiving a first set of pilot signals from a set of antenna elements excited independently on a channel;
 receiving a second set of pilot signals from at least one pair of the antenna elements on the channel, wherein one of the antenna elements is a reference antenna element that is included in each pair and is excited simultaneously with the other antenna element in each pair such that the reference antenna element and the other antenna element in the pair are excited at selected power values that are independent of powers of the first set of pilot signals;
 determining a channel estimate that is based on a channel gain and a relative phase between the reference antenna element and the other antenna element in each pair that are determined from power measurements on the sets of pilot signals; and
 processing data signals adapted in accordance with the channel estimate,
 wherein the power measurements are average power measurements, the second set of pilot signals are adaptive pilot signals, and the reference antenna element and the other antenna element in the pair are excited with a first given phase difference set to zero in a first transmission and with a second given phase difference in a second transmission and wherein the method further comprises:
 transmitting an indication of the magnitude of the relative phase ($|\phi|$),
 wherein, if $|\phi|$ is less than $\pi/2$, the second given phase difference is set to $|\phi|$ and the sign of the relative phase is determined to be negative if a measured power of signals received from the second transmission is greater than a measured power of signals received from the first transmission or the sign of the relative phase is determined to be positive if the measured power of signals received from the second transmission is equal to or less than the measured power of signals received from the first transmission, or if $|\phi|$ is greater than or equal to $\pi/2$, the second given phase difference is set to $\pi-|\phi|$ and the sign of the relative phase is determined to be positive if the measured power of signals received from the second transmission is less than the measured power of signals received from the first transmission or the sign of the relative phase is determined to be negative if the measured power of signals received from the second transmission is equal to or greater than the measured power of signals received from the first transmission.

2. The method of claim 1, wherein the channel gain and the relative phase are determined from multiple samples of power measurements taken for each of the excitations.

3. The method of claim 1, wherein the channel gain and the relative phase are determined from measurements of signals received at a receiver from the excitations, wherein the measurements of signals received at the receiver used to determine the channel gain and the relative phase comprise only power measurements.

4. The method of claim 3, wherein the channel gain and the relative phase are determined from an estimate of noise plus interference variance.

5. A method for processing data signals comprising:
receiving a first set of pilot signals from a set of antenna elements excited independently on a channel;
receiving a second set of pilot signals from at least one pair of the antenna elements on the channel, wherein one of the antenna elements is a reference antenna element that is included in each pair and is excited simultaneously with the other antenna element in each pair such that the reference antenna element and the other antenna element in the pair are excited at selected power values that are independent of powers of the first set of pilot signals;
determining a channel estimate that is based on a channel gain and a relative phase between the reference antenna element and the other antenna element in each pair that are determined from power measurements on the sets of pilot signals; and
processing data signals adapted in accordance with the channel estimate,
wherein the second set of pilot signals are deterministic pilot signals, and
wherein the reference antenna element and the other antenna element in the pair are excited with a first given phase difference set to zero in a first transmission and with a second given phase difference set to $\pi/2$ in a second transmission.

* * * * *